A. J. GIBSON.
Running-Gear.
No. 11,668.
Patented Sept. 12, 1854.
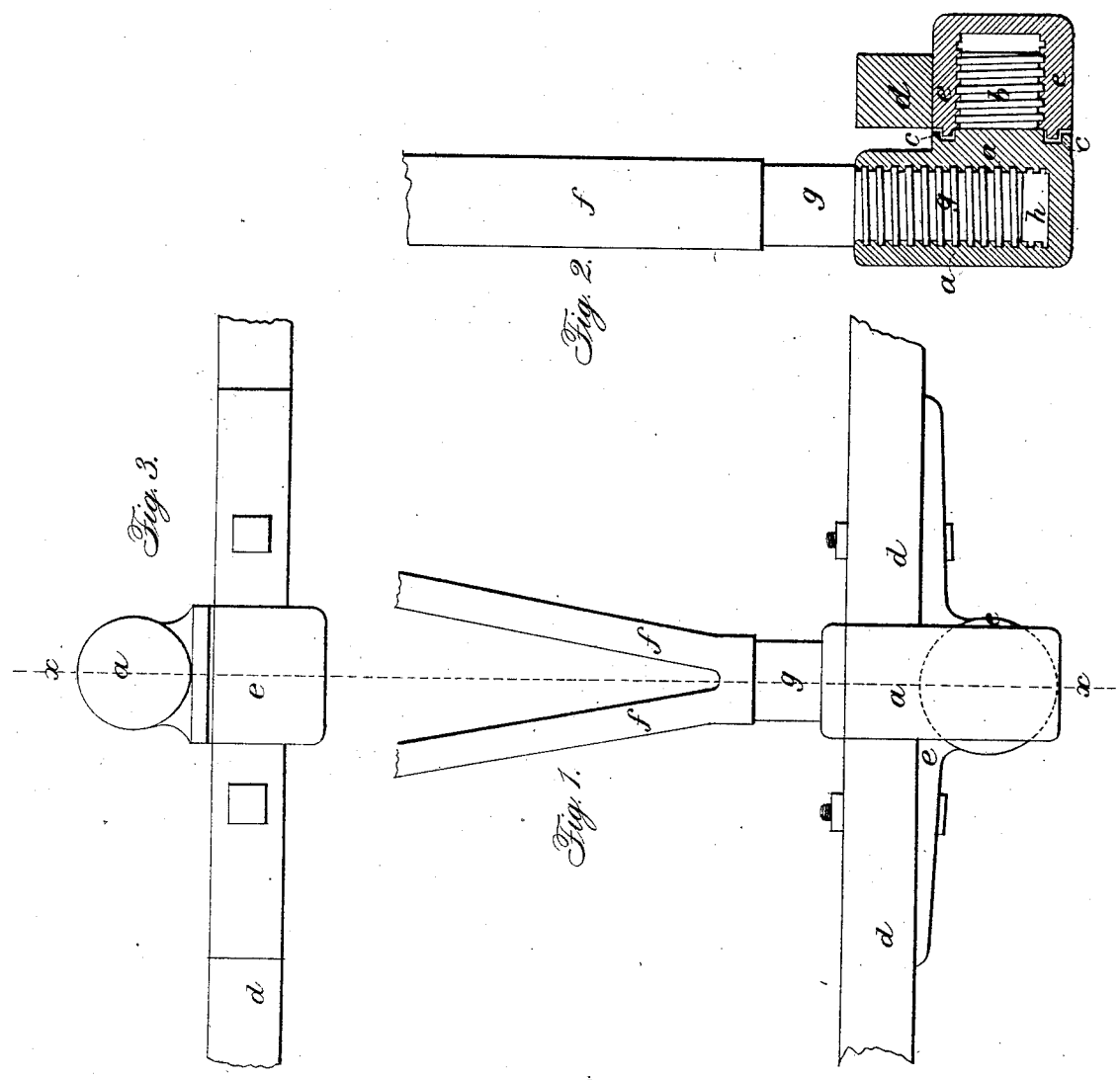

UNITED STATES PATENT OFFICE.

A. J. GIBSON, OF CLINTON, MASSACHUSETTS.

COUPLING FOR CARRIAGES.

Specification of Letters Patent No. 11,668, dated September 12, 1854.

*To all whom it may concern:*

Be it known that I, ABRAM J. GIBSON, of Clinton, in the county of Worcester and State of Massachusetts, have invented new and valuable Improvements in the Running-Gear of Vehicles; and I do hereby declare that the following is a full and exact description thereof, reference being had to the accompanying drawings, making a part of this specification, in which—

Figure 1 is a plan of portion of front axle, perch, and connection of said parts. Fig. 2 is a longitudinal section through the head of bolt shown by line $x$ $x$ Figs. 1 and 2. Fig. 3 is a front view of front axle and perch connections.

Similar letters of reference in the several figures denote the same part.

The nature of my invention consists in the employment of a cylindrical bar of iron, having a threaded bolt projecting downward therefrom, and working in a threaded cylinder formed on, or bolted to the forward axle. The said threaded cylinder projects above the forward axle and turns in a hollow chamber formed in the cylindrical bar, above the threaded part of the bolt. The rods or perches, which are used to connect the forward with the hind axle are brought to the center and formed into one rod having a thread cut on the end thereof, which works in a threaded chamber cut horizontally in the cylindrical bar before mentioned. The advantages gained by this manner of connecting the forward with the rear axle are, that it makes a durable permanent and secure fastening—durable because the threaded bolt, having a long, continued and equal bearing, brings a large amount of surface into action, which is not liable to be worn, as all dust and dirt is excluded from the threaded cylinder, by means of the upper part of the cylinder projecting into and filling the hollow chamber before mentioned. It is also made permanent and secure by giving to the bolt a sufficient length, to keep the axle in a steady and upright position. At the same time allowing it to turn in either direction, without releasing the bolt from the cylinder but a fractional part of its length. The advantage gained by bringing the rods or perches together and forming them into one rod having a thread cut on the end thereof, which turns in a threaded chamber cut in the cylinder bar, is that it allows either of the wheels to be elevated from a horizontal position without having a tendency to twist the rods or perches asunder.

Having pointed out some of the advantages to be derived from my invention, I will now proceed to describe its several parts. $a$ represents a cylindrical bar of iron, from one end of which projects the threaded bolt $b$, it is turned out in the cylindrical bar $a$ around the threaded bolt $b$ so as to form a chamber $c$; $d$ represents the forward axle, and $e$ a cylinder which is bolted or clasped in front of the forward axle $d$, the cylinder $e$ has a threaded chamber cut in the center thereof, which is fitted and adapted to receive the threaded bolt $b$. The upper part of the cylinder $e$ projects above the forward axle $d$ and is turned off on its outer edge just enough to fit closely in the chamber $c$, and allowing the axle $d$ to turn without producing much friction therein.

It will be seen by the inspection of the drawings, that the dust to come in contact with the threaded bolt $b$ must first pass the horizontal joint, then rise in the vertical joint made by the cylinder $e$ projecting into the chamber $c$, then pass along the horizontal joint at the top of the chamber $c$ before it reaches the threaded bolt $b$. This it would not do if the joints were closely fitted; and as the threaded bolt $b$ turns but about one-sixteenth part of an inch out of the cylinder $e$ when the vehicle is turned completely around, there would be little or no wear to the threaded bolt $b$; consequently, there would be no danger arising from the bolts wearing and allowing the foremost axle to become detached from the carriage, as frequently happens by the common mode of attachment.

$f$ $f$ represent the rod or perches which are used to connect the forward with the hind axle,—the rods or perches $f$ $f$ are brought together under the center of the carriage, behind and near the forward axle $d$, where they are made into one bolt $g$ having a thread cut on the end thereof, working in a threaded chamber $h$ cut horizontally in the cylindrical bar of iron $a$, before mentioned.

It will be obvious that when either wheel of the carriage passes over obstacles which happen to be in their way so as to raise them from a horizontal position, the bolt $g$ made by the connection of the rods $f$ $f$ turns in the threaded chamber $h$, thereby materially reducing the torsion produced upon the rods, or perches $f\ f$.

Having described the several parts of my invention, what I claim as new and desire to secure by Letters Patent, is 1. The employment of a cylindrical bar of iron, having a threaded bolt projecting downward, and working in a threaded cylinder on the forward axle, for the purpose and in the manner and form substantially as set forth.

2. I also claim in combination with the cylindrical bar of iron the manner of connecting the rear with the forward axle, by means of a threaded bolt, formed at the connection of the rods or perches, and working in a threaded chamber, cut in the cylindrical bar, substantially as set forth.

In testimony whereof, I have hereunto signed my name before two subscribing witnesses.

A. J. GIBSON.

Witnesses:
 GEO. PATTEN,
 SAML. GRUBB.